United States Patent
Ozbaysal et al.

(10) Patent No.: US 7,328,832 B2
(45) Date of Patent: Feb. 12, 2008

(54) GOLD/NICKEL/COPPER BRAZING ALLOYS FOR BRAZING WC-CO TO TITANIUM ALLOYS

(75) Inventors: Kazim Ozbaysal, Cincinnati, OH (US); David Edwin Budinger, Loveland, OH (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 11/236,953

(22) Filed: Sep. 28, 2005

(65) Prior Publication Data

US 2007/0068992 A1  Mar. 29, 2007

(51) Int. Cl.
B23K 31/02 (2006.01)
C22C 5/02 (2006.01)
C22C 19/03 (2006.01)

(52) U.S. Cl. .................. 228/245; 228/248.1; 420/456; 420/457; 420/512

(58) Field of Classification Search ...................... None
See application file for complete search history.

(56) References Cited

U.S. PATENT DOCUMENTS

| 4,029,479 | A |  | 6/1977 | Parker |
|---|---|---|---|---|
| 4,040,822 | A |  | 8/1977 | Stern |
| 4,252,562 | A |  | 2/1981 | D'Silva |
| 4,447,391 | A |  | 5/1984 | Mizuhara |
| 4,448,605 | A |  | 5/1984 | Mizuhara |
| 4,486,386 | A |  | 12/1984 | Mizuhara |
| 4,604,328 | A |  | 8/1986 | Mizuhara |
| 4,604,636 | A |  | 8/1986 | Dalal |
| 4,606,978 | A |  | 8/1986 | Mizuhara |
| 4,606,982 | A |  | 8/1986 | Nelson et al. |
| 4,690,876 | A |  | 9/1987 | Mizuhara |
| 4,903,890 | A | * | 2/1990 | Mizuhara ............... 228/262.31 |
| 4,938,922 | A |  | 7/1990 | Mizuhara |
| 5,033,666 | A | * | 7/1991 | Keusseyan et al. ...... 228/122.1 |
| 5,368,220 | A | * | 11/1994 | Mizuhara et al. ........ 228/124.5 |
| 2004/0086416 | A1 | * | 5/2004 | Winstein .................... 420/507 |
| 2004/0256442 | A1 |  | 12/2004 | Gates, Jr. |

OTHER PUBLICATIONS

Web page www.handyharmancanada.com, regarding "Brazing with Gold Filler Metals" (date of first publication unknown). Applicants admit the status of this publication as prior art for the limited purpose of examination of this application, but otherwise reserve the right to challenge the status of this publication as prior art.

Chuang, T.H. et al., "Brazing of Zirconia with AgCuTi and SnAgTi Active Filler Metals," *Metallurgical and Materials Transactions*, 31A, 6, pp. 1591-1597 (Jun. 2000).

Oda, Y. et al., "Effect of corrosion on the strength of soldered titanium and Ti-6Al-4V alloy," *Dental Materials*, pp. 167-172 (May 1996).

Vianco, P. et al., "Aging of Brazed Joints—Interface Reactions in Base Metal/Filler Metal Couples-Part 1: Low-Temperature Ag-Cu-Ti Filler Metal," *Welding Journal*, pp. 201-S-210-S (Oct. 2002).

Vianco, P. et al., Aging of Braze Joints: Interface Reactions in Base Metal/Filler Metal Couples, Part II: High-Temperature Au-Ni-Ti Braze Alloy, *Welding Journal*, pp. 256-S-264-S (Nov. 2002).

* cited by examiner

*Primary Examiner*—Kiley Stoner
(74) *Attorney, Agent, or Firm*—Marcella R. Louke; William Scott Andes

(57) ABSTRACT

A brazing material including about 40 to about 60 percent by weight gold, about 5 to about 16 percent by weight nickel and about 35 to about 55 percent by weight copper.

22 Claims, No Drawings

GOLD/NICKEL/COPPER BRAZING ALLOYS FOR BRAZING WC-CO TO TITANIUM ALLOYS

BACKGROUND OF THE INVENTION

The present invention relates to brazing alloys and, more particularly, to brazing alloys for brazing tungsten carbide-cobalt composites to titanium alloys.

Tungsten carbide-cobalt materials (herein WC—Co) often are used to make various parts and components for aircraft engine applications due to the high mechanical strength, hardness, corrosion resistance and wear resistance of WC—Co. For example, wear resistant carboloy pads used in aircraft engines typically are constructed from (90-98 wt %) WC and (2-10 wt %) Co mixtures. The WC—Co carboloy pads typically are brazed to fan and compressor blade midspan shrouds for wear applications in aircraft engines. These blades typically are made of Ti 6Al-4V and/or Ti 8Al-1V-1Mo alloys with beta transus temperatures at or slightly above 1800° F.

In the prior art, titanium/nickel/copper braze alloys (herein TiNiCu), such as Ti-15Ni-15Cu, have been used to braze carboloy pads to titanium alloy blade midspan shrouds. TiNiCu braze foils have also been used for brazing WC—Co to titanium alloys since TiNiCu is the main braze alloy for brazing of titanium alloys with good strength and ductility. However, TiNiCu alloys have presented various impact failure problems when used in applications involving the brazing of WC—Co to titanium alloys, including chipping and fracturing at the braze joint when the brazed pads are subjected to an impact force (e.g., collision with a bird, an adjacent blade or various debris).

It has been found that the braze impact failures may be attributed to the low ductility brittle braze joints formed when brazing WC—Co to titanium alloys using TiNiCu brazing alloys. In particular, it has been found that tungsten and cobalt from the carboloy pad dissolves into the braze joint when the TiNiCu brazing material is in the molten state, thereby forming a low ductility, high hardness (e.g., about 1200 KHN) W—Co—Ti—Ni—Cu alloy braze interface. The braze interface exhibits cracking at impact energies as low as 0.30 joules and the carboloy pad is liberated from the substrate at the brittle braze interface at an impact energy of 0.60 joules.

Thus, TiNiCu braze alloys that have been successfully used for brazing of titanium to titanium alloys cannot be used for brazing of WC—Co to titanium alloys where impact resistance is required.

Industrially available braze alloys have been unable to meet the combined demands of low braze temperatures (i.e., below 1800° F.), high ductility and low cost necessary for aircraft engine applications. For example, Nioro (Au 82% and Ni 18%) and Nicoro80 (Au 81.5%, Cu 16.5% and Ni 2%) are heavy in gold and light in copper and therefore are expensive and have poor wetting properties and ductility. Furthermore, alloys incorporating Au 35%, Cu 62% and Ni 3% have liquidus temperatures at or above 1886° F., which is not applicable for brazing WC—Co to titanium alloys.

Accordingly, there is a need for ductile, impact resistant brazing alloys with brazing temperatures below the beta transus temperature of the substrate titanium alloy. In particular, there is a need for brazing alloys for brazing WC—Co materials to titanium alloys without forming a brittle braze interface.

BRIEF DESCRIPTION OF THE INVENTION

In one aspect, a brazing material is provided, wherein the brazing material includes about 40 to about 60 percent by weight gold, about 5 to about 16 percent by weight nickel and about 35 to about 55 percent by weight copper.

In another aspect, a brazing material is provided, wherein the brazing material includes about 45 to about 49 percent by weight gold, about 9 to about 11 percent by weight nickel and about 41 to about 45 percent by weight copper.

In another aspect, a brazing material is provided, wherein the brazing material includes about 47 percent by weight gold, about 10 percent by weight nickel and about 43 percent by weight copper.

In another aspect, a brazing material is provided, wherein the brazing material consists essentially of gold, nickel and copper and the gold, nickel and copper are present in amounts sufficient to provide the brazing material with a brazing temperature of about 1750° F. to about 1800° F. and a braze joint hardness of about 450 to about 600 KHN.

In another aspect, a method for brazing a first substrate to a second substrate is provided. The method includes the steps of positioning a brazing material between the first substrate and the second substrate, wherein the brazing material includes about 40 to about 60 percent by weight gold, about 5 to about 16 percent by weight nickel and about 35 to about 55 percent by weight copper, and raising the temperature of the brazing material to about 1750 to about 1800° F. for at least about 1 minute.

Other aspects of the present invention will become apparent from the following detailed description and the appended claims.

DETAILED DESCRIPTION OF THE INVENTION

The present invention is directed to Au (40 to 60 wt %), Ni (5 to 15 wt %) and Cu (35 to 55 wt %) alloys for brazing a first substrate to a second substrate (e.g., WC—Co materials to titanium alloys) at brazing temperatures generally below 1800° F., thereby preventing damage to the mechanical properties of the substrates whose beta transus temperatures are at or above 1800° F. In particular, the alloys of the present invention have a nickel content that is sufficiently high to ensure excellent wettability to both WC—Co and titanium substrates, a copper content that is sufficiently high to ensure excellent ductility for impact resistance and a gold content that is reasonably low to ensure adequate cost.

In one aspect, the brazing alloys of the present invention include about 40 to about 60 percent by weight gold, about 5 to about 16 percent by weight nickel and about 35 to about 55 percent by weight copper.

In another aspect, the brazing alloys of the present invention include about 45 to about 49 percent by weight gold, about 9 to about 11 percent by weight nickel and about 41 to about 45 percent by weight copper.

In another aspect, the brazing alloys of the present invention include about 47 percent by weight gold, about 10 percent by weight nickel and about 43 percent by weight copper.

In another aspect, the weight percentages of gold, nickel and copper in the brazing alloys of the present invention may be selected based upon the intended use of the brazing alloy. In particular, the weight percentages may be selected such that the resulting brazing alloy has high impact resistance and ductility (i.e., low hardness) after brazing (i.e., post-braze) and melts below the beta transus temperature of the substrate being brazed such that the mechanical properties of the substrate are not negatively affected (e.g., by way of phase transformations) by high brazing temperatures.

The brazing alloys of the present invention may be provided in various forms. In one aspect, the brazing alloys may be provided as a homogeneous composition including gold, nickel and copper. In another aspect, the brazing alloys may be provided as powders. In another aspect, the brazing alloys may be provided as layered or laminated films or foils.

In the powder form, the brazing alloys may be provided as a mixture of gold, nickel and copper powders, wherein the metals are present in the appropriate quantities. Alternatively, the mixture may include gold powder and nickel/copper powder, nickel powder and gold/copper powder, copper powder and gold/nickel powder or various combinations thereof, wherein the metals are present in the appropriate quantities. The powder may include a homogeneous alloy of gold, nickel and copper in the appropriate quantities prior to brazing or, alternatively, may not form a homogeneous alloy until the power is heated to the appropriate melting/brazing temperature.

In the layered form, the metals or alloys of the gold/nickel/copper brazing alloys of the present invention may be provided in separate layers, thereby providing a homogeneous alloy of the similar composition after melting to achieve the necessary ductility and hardness for impact resistance. For example, a brazing alloy according to the present invention may be provided as a laminated film or a layered material, wherein a layer of copper/nickel alloy foil is positioned between two layers. of gold foil or a layer of copper foil is positioned between two layers of gold/nickel alloy foil or a layer of copper is position between a layer of gold foil and a layer of nickel foil, wherein the metals are present in the appropriate quantities. Those skilled in the art will appreciate that various arrangements and numbers of layers and various combinations of metals and/or alloys in various layers are within the scope of the present invention. Furthermore, those skilled in the art will appreciate that the layered material according to the present invention may be used in its flat (i.e., planar) configuration or may be rolled up prior to brazing.

EXAMPLE 1

A brazing material was prepared by positioning a copper foil between two layers of gold/nickel braze foil. The thickness of each layer was selected such that the resulting material included about 47 wt % gold, about 10 wt % nickel and about 43 wt % copper with respect to the total weight of the layered material. The resulting material had a brazing temperature of about 1775° F.

EXAMPLE 2

A brazing material was prepared by positioning a copper foil between two layers of gold/nickel braze foil. The thickness of each layer was selected such that the resulting material included about 52 wt % gold, about 11 wt % nickel and about 36 wt % copper with respect to the total weight of the layered material. The resulting material had a brazing temperature of about 1795° F.

EXAMPLE 3

The brazing material of Example 1 was rolled up and positioned between a WC—Co (2-10% cobalt) carboloy pad and a titanium alloy (90 wt % Ti, 6 wt % Al and 4 wt % V) midspan shroud and the assembly was raised to a temperature of about 1800° F. (by way of induction heating) for about 10 minutes under vacuum (about $10^{-4}$ torr). After the assembly was allowed to cool, the braze joint was determined to have a hardness of about 550 KHN.

EXAMPLE 4

The brazing material of Example 2 was rolled up and positioned between a WC—Co (2-10% cobalt) carboloy pad and a titanium alloy (90 wt % Ti, 6 wt % Al and 4 wt % V) midspan shroud and the assembly was raised to a temperature of about 1800° F. (by way of induction heating) for about 10 minutes under vacuum (about $10^{-4}$ torr). After the assembly was allowed to cool, the braze joint was determined to have a hardness of about 570 KHN.

Accordingly, the gold/nickel/copper brazing alloys of the present invention are ductile and impact resistant with respect to titanium/nickel/copper brazing alloys and exhibit excellent wetting when used to join various WC—Co materials to various titanium alloy.

Although the gold/nickel/copper brazing alloys of the present invention are described herein with respect to certain aspects, modifications may occur to those skilled in the art upon reading the specification. The present invention includes all such modifications and is limited only by the scope of the claims.

The invention claimed is:

1. A brazing material for brazing a first substrate comprising tungsten/carbide/cobalt material to a second substrate comprising titanium or alloys thereof, said brazing material consisting of about 45 to about 49 percent by weight gold, about 9 to about 11 percent by weight nickel and about 41 to about 55 percent by weight copper, wherein said gold, nickel and copper are present in amounts sufficient to provide said brazing material with a brazing temperature of about 1750° F. to about 1800° F. and a post-braze hardness of about 450 to about 600 KHN.

2. The brazing material of claim 1 having the following composition: about 47 percent by weight gold, about 10 percent by weight nickel and about 43 percent by weight copper.

3. A method for brazing a first substrate to a second substrate comprising the steps of:
    positioning a brazing material between said first substrate and said second substrate, wherein said brazing material includes about 40 to about 60 percent by weight gold, about 5 to about 16 percent by weight nickel and greater than 35.25 to about 55 percent by weight copper; and
    raising a temperature of said brazing material to about 1750 to about 1800° F. for at least about 1 minute,
    wherein said first substrate includes a tungsten/carbide/cobalt material and said second substrate includes titanium or alloys thereof.

4. A method for brazing a first substrate to a second substrate comprising the steps of:
    positioning a brazing material between said first substrate and said second substrate, wherein said brazing material includes about 40 to about 60 percent by weight gold, about 5 to about 16 percent by weight nickel and about 35 to about 55 percent by weight copper; and
    raising a temperature of said brazing material to about 1750 to about 1800° F. for at least about 1 minute;

wherein said first substrate includes a tungsten/carbide/cobalt material and said second substrate includes titanium or alloys thereof.

5. The method of claim 4 wherein said tungsten/carbide/cobalt material includes about 2 to about 10 percent cobalt.

6. The method of claim 4 wherein the brazing material is in a form selected from the group consisting of a homogeneous alloy, a powder, or a layered form.

7. The method of claim 6 wherein the brazing material is in a layered formed, wherein said layered form includes at least one combination selected from the group consisting of at least one layer of copper and at least one layer of a gold/nickel alloy, at least one layer of gold and at least one layer of copper/nickel alloy, and at least one layer of nickel and at least one layer of gold/copper alloy.

8. A brazing material consisting of 40 to about 60 percent by weight gold about 9 to about 16 percent by weight nickel and about 41 to about 55 percent by weight copper.

9. The brazing material of claim 8 in homogeneous alloy form.

10. The brazing material of claim 8 in powder form.

11. The brazing material of claim 8 in layered form.

12. The brazing material of claim 11 wherein said layered form includes at least one layer of copper and at least one layer of gold/nickel alloy.

13. The brazing material of claim 11 wherein said layered form includes at least one layer of gold and at least one layer of copper/nickel alloy.

14. The brazing material of claim 11 wherein said layer form includes at least one layer of nickel and at least one layer of gold/copper alloy.

15. The brazing material of claim 8 having a composition selected such that said material has a brazing temperature of about 1750 to about 1800° F. and a post-braze hardness of about 450 to about 600 KHN.

16. The brazing material of claim 15 having a post-braze hardness of about 550 to about 570 KHN.

17. A method for brazing a first substrate to a second substrate comprising the steps of:

positioning a brazing material between said first substrate and said second substrate, wherein said first substrate includes a tungsten/carbide/cobalt material and wherein said brazing material includes about 40 to about 60 percent by weight gold, about 9 to about 16 percent by weight nickel and about 35 to about 55 percent by weight copper; and raising a temperature of said brazing material to about 1750 to about 1800° F. for at least about 1 minute wherein said first substrate includes a tungsten/carbide/cobalt material and said second substrate includes titanium or alloys thereof.

18. The method of claim 17 wherein said brazing material is a powder.

19. The method of claim 17 wherein said brazing material is a layered material.

20. The method of claim 17 wherein said raising step is performed under a vacuum.

21. The method of claim 17 wherein said brazing material has the following composition: about 45 to about 49 percent by weight gold, about 9 to about 11 percent by weight nickel and about 41 to about 45 percent by weight copper.

22. The method of claim 17 wherein said brazing material has the following composition: about 47 percent by weight gold, about 10 percent by weight nickel and about 43 percent by weight copper.

* * * * *